United States Patent
Hsu

(10) Patent No.: US 10,949,275 B1
(45) Date of Patent: Mar. 16, 2021

(54) MESSAGE REQUEST METHOD AND DEVICE THEREOF

(71) Applicant: REALTEK SEMICONDUCTOR CORP., Hsinchu (TW)

(72) Inventor: Fan-Hau Hsu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/744,344

(22) Filed: Jan. 16, 2020

(30) Foreign Application Priority Data

Sep. 9, 2019 (TW) ................................ 108132487

(51) Int. Cl.
| | |
|---|---|
| *G06F 3/00* | (2006.01) |
| *G06F 9/54* | (2006.01) |
| *G06F 13/16* | (2006.01) |
| *G06F 9/48* | (2006.01) |

(52) U.S. Cl.
CPC ............ *G06F 9/546* (2013.01); *G06F 9/4881* (2013.01); *G06F 9/542* (2013.01); *G06F 9/544* (2013.01); *G06F 13/1642* (2013.01)

(58) Field of Classification Search
CPC ........................................................ G06F 9/54
USPC ........................................................ 719/310
See application file for complete search history.

(56) References Cited

U.S. PATENT DOCUMENTS

| | | | | |
|---|---|---|---|---|
| 5,434,975 A | * | 7/1995 | Allen ...................... | G06F 9/544 709/215 |
| 2003/0189930 A1 | * | 10/2003 | Terrell ..................... | H04L 49/90 370/389 |
| 2012/0221835 A1 | * | 8/2012 | Tran ....................... | G06F 9/3826 712/208 |
| 2016/0275031 A1 | * | 9/2016 | Lee ......................... | G06F 13/20 |

OTHER PUBLICATIONS

Sumi Choi, Design of a Flexible Open Platform for High Performance Active Networks. (Year: 1999).*

* cited by examiner

*Primary Examiner* — Lechi Truong
(74) *Attorney, Agent, or Firm* — Birch, Stewat, Kolasch & Birch, LLP

(57) ABSTRACT

A message request method and a device of the message request method are provided, and the device is applicable to a USB multi-port electronic device including N type-C ports. The message request method includes receiving a message, and assigning, according to a port identifier of the message, the message to a corresponding message pending queue of N message pending queues; selecting, according to a largest message pending first algorithm, a message pending queue with a maximum quantity of messages from the N message pending queues, and obtaining a queue identifier corresponding to the message pending queue; extracting the message from the message pending queue corresponding to the queue identifier; and delivering the message to a policy engine of the type-C port corresponding to the queue identifier, to make a request for the message.

14 Claims, 5 Drawing Sheets

MESSAGE REQUEST METHOD AND DEVICE THEREOF

CROSS-REFERENCE TO RELATED APPLICATION

This non-provisional application claims priority under 35 U.S.C. § 119(a) to patent application Ser. No. 10/813,2487 in Taiwan, R.O.C. on Sep. 9, 2019, the entire contents of which are hereby incorporated by reference.

BACKGROUND

Technical Field

The present invention relates to a message scheduling technology, and in particular, to a message request method and a device thereof applicable to a USB multi-port electronic device.

Related Art

A universal serial bus (USB) is widely applied to various electronic products. A USB type-C connector is used as an example. Because there is no positive or negative difference in the specification design of the type-C connector, and a user can easily insert and use the connector without first determining a direction of the connector, the connector is increasingly widely used.

In today's mobile devices, for example, a laptop, a dock, and a hub, a conventional USB port is gradually replaced with the USB type-C connector described above to conform to the world trend. However, in a multi-port mobile device, the complexity of a device policy manager (control software) increases due to an increase of a quantity of ports. Therefore, how to reduce the complexity of the device policy manager becomes a quite important topic, and there is no specific solution at present.

SUMMARY

In view of this, the present invention provides a message request method, applicable to a USB multi-port electronic device, and the USB multi-port electronic device includes N type-C ports. The message request method includes: receiving a message, and assigning, according to a port identifier of the message, the message to a corresponding message pending queue of N message pending queues; selecting, according to a largest message pending first algorithm, a message pending queue with a maximum quantity of messages from the N message pending queues, and obtaining a queue identifier corresponding to the message pending queue, the queue identifier being in a one-to-one correspondence with the port identifier; extracting the message from the message pending queue corresponding to the queue identifier; and delivering the extracted message to a policy engine of a type-C port corresponding to the queue identifier, to make a request for the message.

The present invention further provides a message request device, applicable to a USB multi-port electronic device, and the USB multi-port electronic device includes N type-C ports. The message request device includes a classifier, N message pending queues, a message scheduler, and a message egress port. The classifier is configured to receive a message, and assign, according to a port identifier of the message, the message to a corresponding message pending queue of N message pending queues. The message scheduler is configured to select, according to a largest message pending first algorithm, a message pending queue with a maximum quantity of messages from the N message pending queues, and obtain a queue identifier corresponding to the message pending queue. The message scheduler is further configured to extract the message from the message pending queue corresponding to the queue identifier, and deliver, through the message egress port, the message to a policy engine of a type-C port corresponding to the queue identifier, to make a request for the message.

According to some embodiments, before the step of assigning, according to a port identifier of the message, the message to a corresponding message pending queue of N message pending queues, the message request method further includes: first determining whether the message pending queue is full, and assigning the message to the message pending queue when the message pending queue is not full. In addition, when the message pending queue is full, a full command is delivered to a device policy management brain, causing the device policy management brain to redeliver the message.

According to some embodiments, after the step of assigning, according to a port identifier of the message, the message to a corresponding message pending queue of N message pending queues, the message request method further includes: returning a successful command to the device policy management brain.

According to some embodiments, the largest message pending first algorithm further includes reading a quantity of messages of each message pending queue of the N message pending queues and making a comparison: outputting a queue identifier of a corresponding message pending queue when there is a maximum quantity of messages; outputting a minimum queue identifier in the message pending queues when there are same quantities of messages; and outputting 0 when all quantities of messages are 0.

According to some embodiments, after the step of obtaining a queue identifier corresponding to the message pending queue, the message request method further includes: querying a state of the policy engine of the type-C port corresponding to the queue identifier, and extracting the message from the message pending queue corresponding to the queue identifier when the state of the policy engine is a non-busy state. When the state of the policy engine is a busy state, a message pending queue with a second maximum quantity of messages is selected from the N message pending queues, and a queue identifier corresponding to the message pending queue is obtained.

In summary, the present invention can effectively reduce the design complexity with the application of the USB multi-port electronic device, thereby achieving the effect of real-time processing.

DETAILED DESCRIPTION

A message request method and a device thereof provided in the present invention are applicable to a USB multi-port electronic device, and the USB multi-port electronic device may be but not limited to a laptop, a dock, a hub, and the like.

Figure 1:
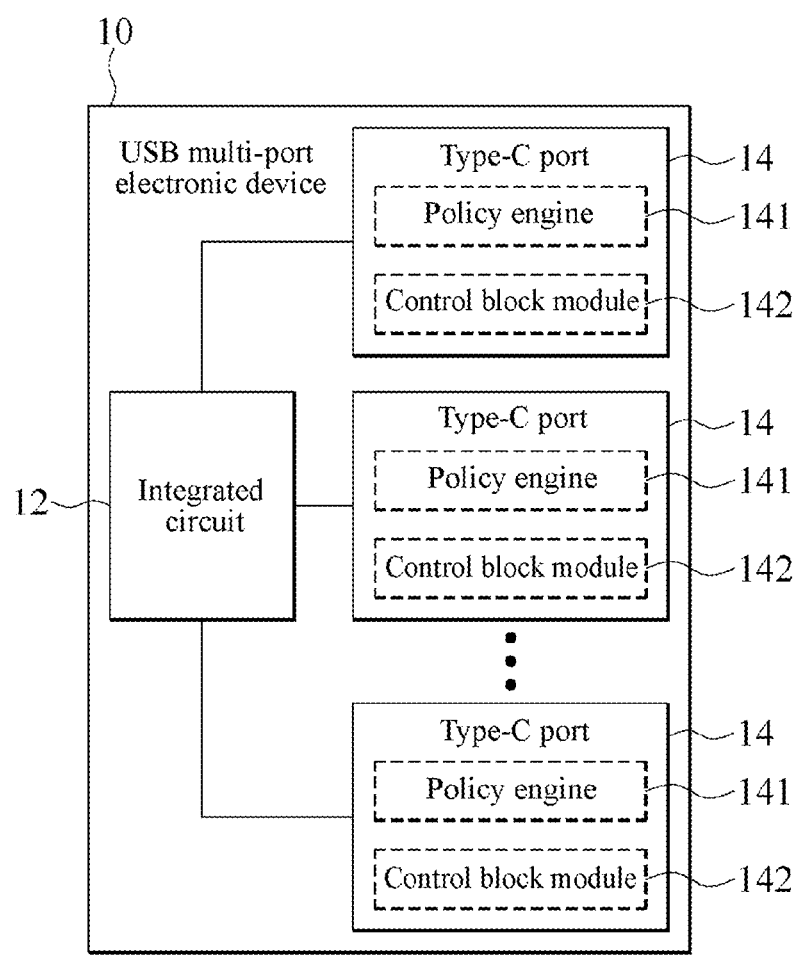
FIG. 1 is a schematic block diagram of an outline of a USB multi-port electronic device.

FIG. 1 is a schematic block diagram of an outline of a USB multi-port electronic device. Referring to FIG. 1, the USB multi-port electronic device 10 at least includes an integrated circuit (IC) 12 and N USB type-C ports (briefly referred to as type-C port below) 14. The IC 12 is electrically connected to each type-C port 14, each type-C port 14 has a port identifier (Port ID) and includes a policy engine 141 and a control block module 142, and the type-C port 14 may be used to connect to an external electronic device.

Figure 2:
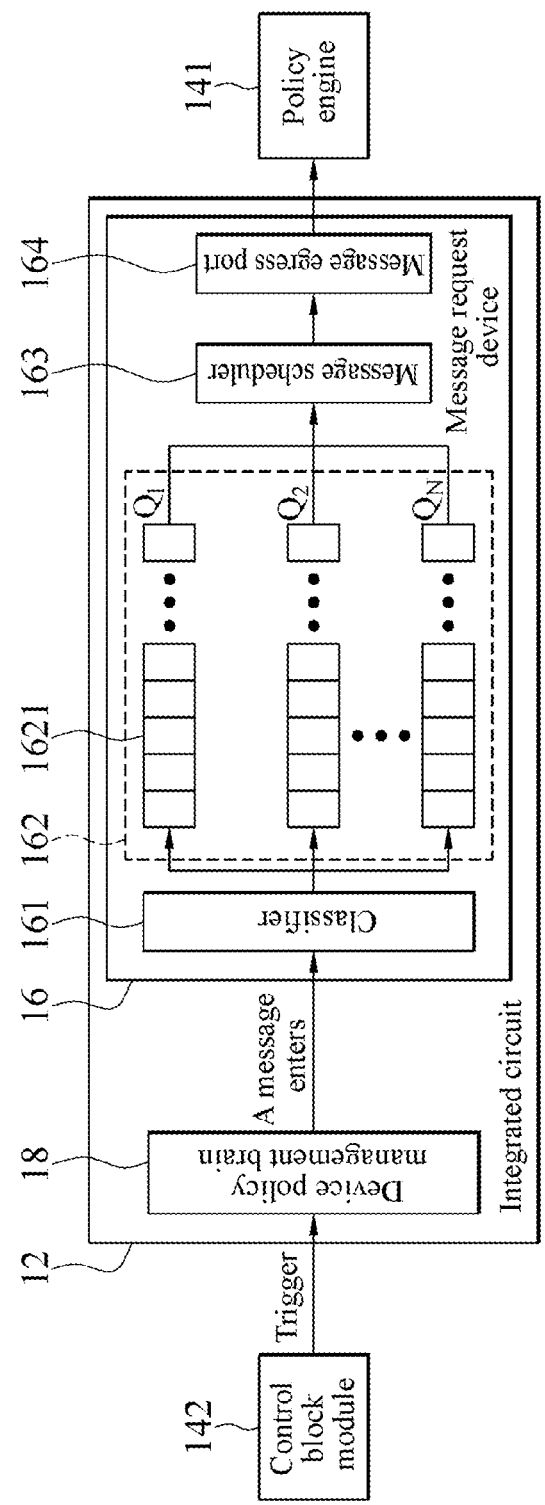
FIG. 2 is a schematic block diagram of an embodiment of a message request device according to the present invention.

FIG. 2 is a schematic block diagram of an embodiment of a message request device according to the present invention. Referring to FIG. 1 and FIG. 2, the IC 12 includes a message request device 16 and a device policy management brain 18, the message request device 16 is signally connected to the device policy management brain 18 and the policy engine 141 of the type-C port 14, and the device policy management brain 18 is signally connected to the control block module 142 of the type-C port 14. The message request device 16 further includes a classifier 161, N message pending queues 162, a message scheduler 163, and a message egress port 164. The classifier 161 is signally connected to the device policy management brain 18 and the message pending queue 162, and is configured to classify incoming messages. The message pending queue 162 is signally connected to the message scheduler 163, and is used to temporarily store a message to be requested for the type-C port 14. The message pending queue 162 is completed by using a circular buffer data structure, and each message pending queue 162 has a queue identifier (Queue ID), for example, $Q_1, Q_2, \ldots, Q_N$. Each message pending queue 162 provides two interfaces (not shown in the figure), one is a deposit interface, and the other is an extract interface, so that the message is sent to the message pending queue 162 through the deposit interface and the message is extracted from the message pending queue 162 through the extract interface. Each message pending queue 162 includes a plurality of queue units 1621, each queue unit 1621 buffers a message, and a quantity of queue units 1621 is a design experience value. The message scheduler 163 is signally connected to the message egress port 164. The message scheduler 163 selects a message pending queue 162 by using a largest message pending first algorithm, and obtains a message and a queue identifier corresponding to the selected message pending queue 162. The message egress port 164 is signally connected to the policy engine 141 of the type-C port 14, and has a function of sending messages. A quantity of the message pending queues 162 and a quantity of the type-C ports 14 are the same and are N, and the message pending queue 162 is in a one-to-one correspondence with the type-C port 14. N may be greater than or equal to 2. Although the quantity in the embodiment of the present invention is at least 3, this is only one of the embodiments, and the quantity cannot be limited thereto.

According to an embodiment, the message request device 16 is implemented by the IC 12, and the IC 12 may be but not limited to a USB type-C port controller IC, a USB type-C power delivery controller IC, or a USB type-C port manager IC.

Figure 3:
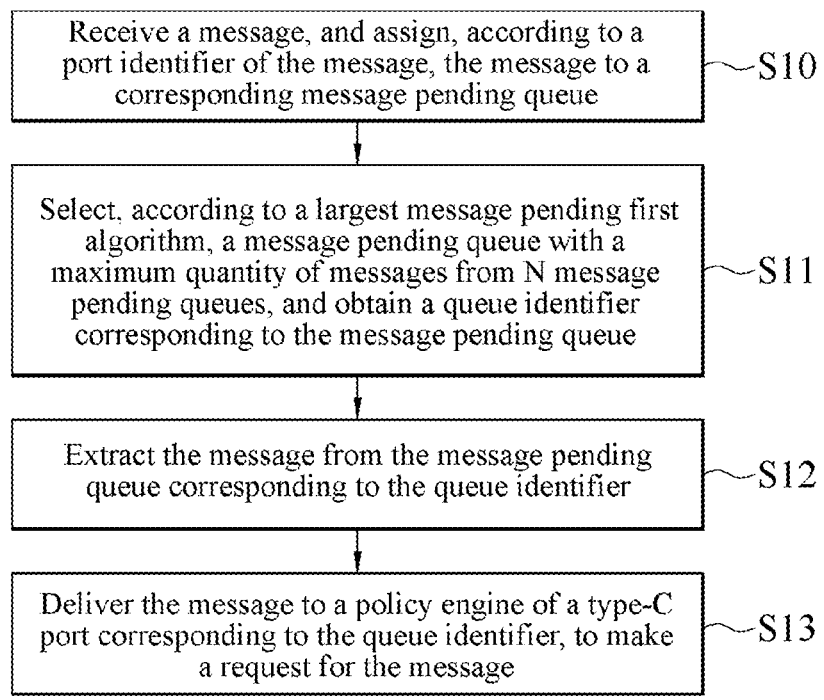
FIG. 3 is a schematic flowchart of an embodiment of a message request method according to the present invention.

FIG. 3 is a schematic flowchart of an embodiment of a message request method according to the present invention. Referring to FIG. 2 and FIG. 3 together, the IC 12 may implement a scheduling request program for the message according to the message request method in any embodiment of the present invention. As shown in step S10, the classifier 161 receives a message, and assigns, according to a port identifier of the message, the message to a corresponding message pending queue 162 of N message pending queues 162. As shown in step S1, the message scheduler 163 selects, according to a largest message pending first algorithm, a message pending queue 162 with a maximum quantity of messages from the N message pending queues 162, and obtains a queue identifier corresponding to the message pending queue 162. Because the queue identifier is in a one-to-one correspondence with the port identifier, the corresponding type-C port 14 to which the message is delivered can be learned according to the queue identifier. As shown in step S12, the message scheduler 163 extracts an earliest stored message from the message pending queue 162 corresponding to the queue identifier. As shown in step S13, the message scheduler 163 delivers, through the message egress port 164, the extracted message to a policy engine 141 of the type-C port 14 corresponding to the queue identifier, to make a request for the message.

According to an embodiment, the message received by the classifier 161 may be a message requested by a local policy, or may be a requested message sent from the type-C port 14 or an external interface. According to an embodiment, the message may be but not limited to a power delivery message.

According to an embodiment, N message pending queues 14 are implemented by a buffer storage. The buffer storage may be a volatile memory such as a random access memory (RAM) and a static random access memory (SRAM), but is not limited thereto.

Figure 4:
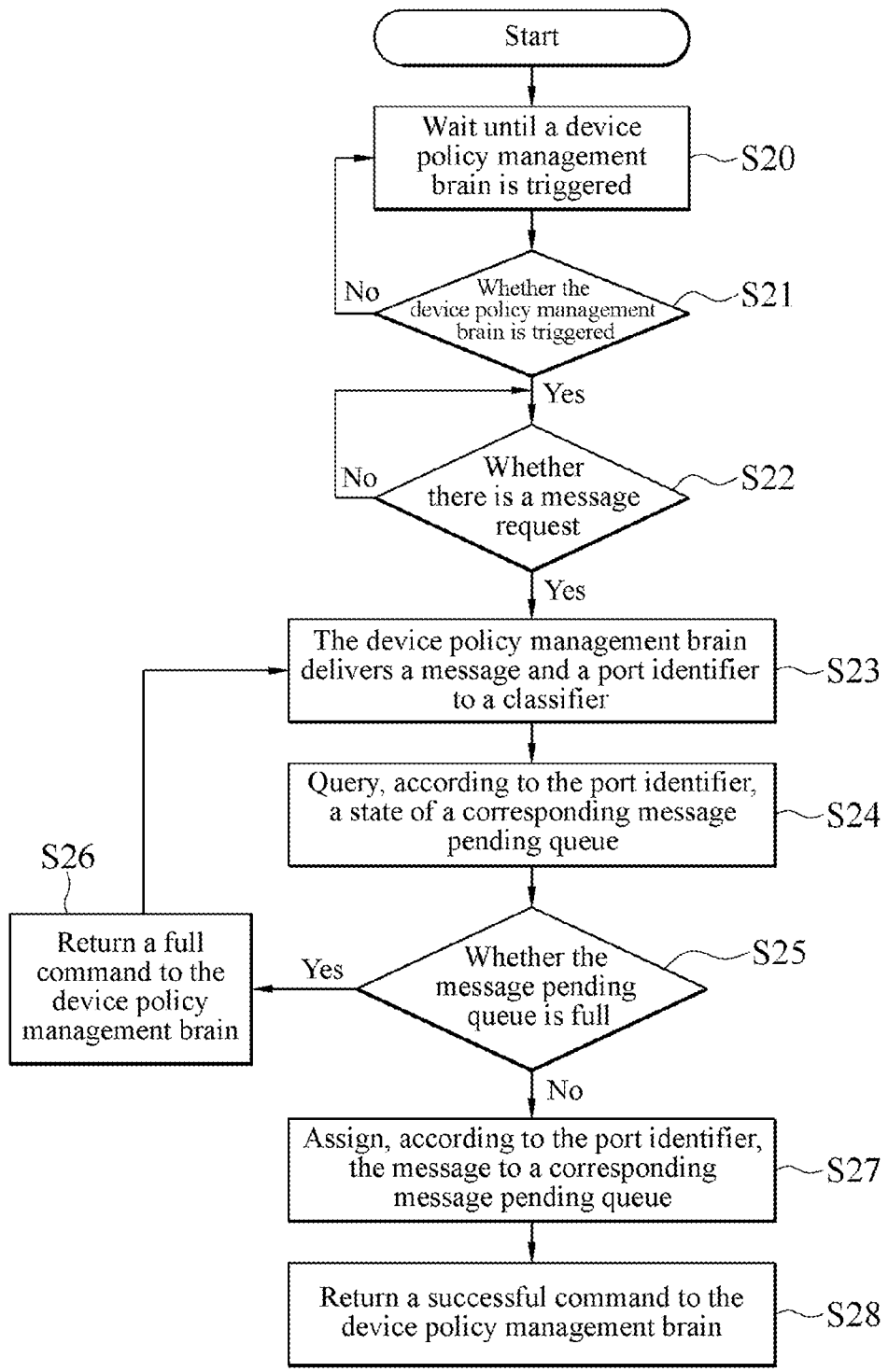
FIG. 4 is a schematic flowchart of an embodiment of delivering a message to a classifier in a message request method according to the present invention.

FIG. 4 is a schematic flowchart of an embodiment of delivering a message to a classifier in a message request method according to the present invention. Referring to FIG. 1 to FIG. 4, as shown in step S20, wait until the device policy management brain 18 is triggered. As shown in step S21, it is determined whether the device policy management brain 18 is triggered by the control block module 142, and if the device policy management brain 18 is not triggered, the device policy management brain 18 in the IC 12 may return to step S20. As shown in step S22, if the device policy management brain 18 has been triggered by the control block module 142 of one of the type-C ports 14, it is further determined whether the device policy management brain 18 has received a message request, and next step S23 is performed when there is the message request. As shown in step S23, the device policy management brain 18 delivers the message and the port identifier thereof to the classifier 161. As shown in step S24, the classifier 161 queries, according to the port identifier of the message, a state of the corresponding message pending queue 162, and as shown in step S25, the classifier 161 determines whether the message pending queue 162 is full. As shown in step S26, when determining that the message pending queue 162 is full, the classifier 161 returns a full command to the device policy management brain 18, and returns to step S23, causing the device policy management brain 18 to redeliver the message. As shown in step S27, when determining that the message pending queue 162 is not full, the classifier 161 assigns, according to the port identifier, the message to a corresponding message pending queue 162 of the N message pending queues 162. After assigning the message to the corresponding message pending queue 162, as shown in step S28, the classifier 161 returns a successful command to the device policy management brain 18, and returns to step S22, to proceed to processing of a next message request.

Figure 5:
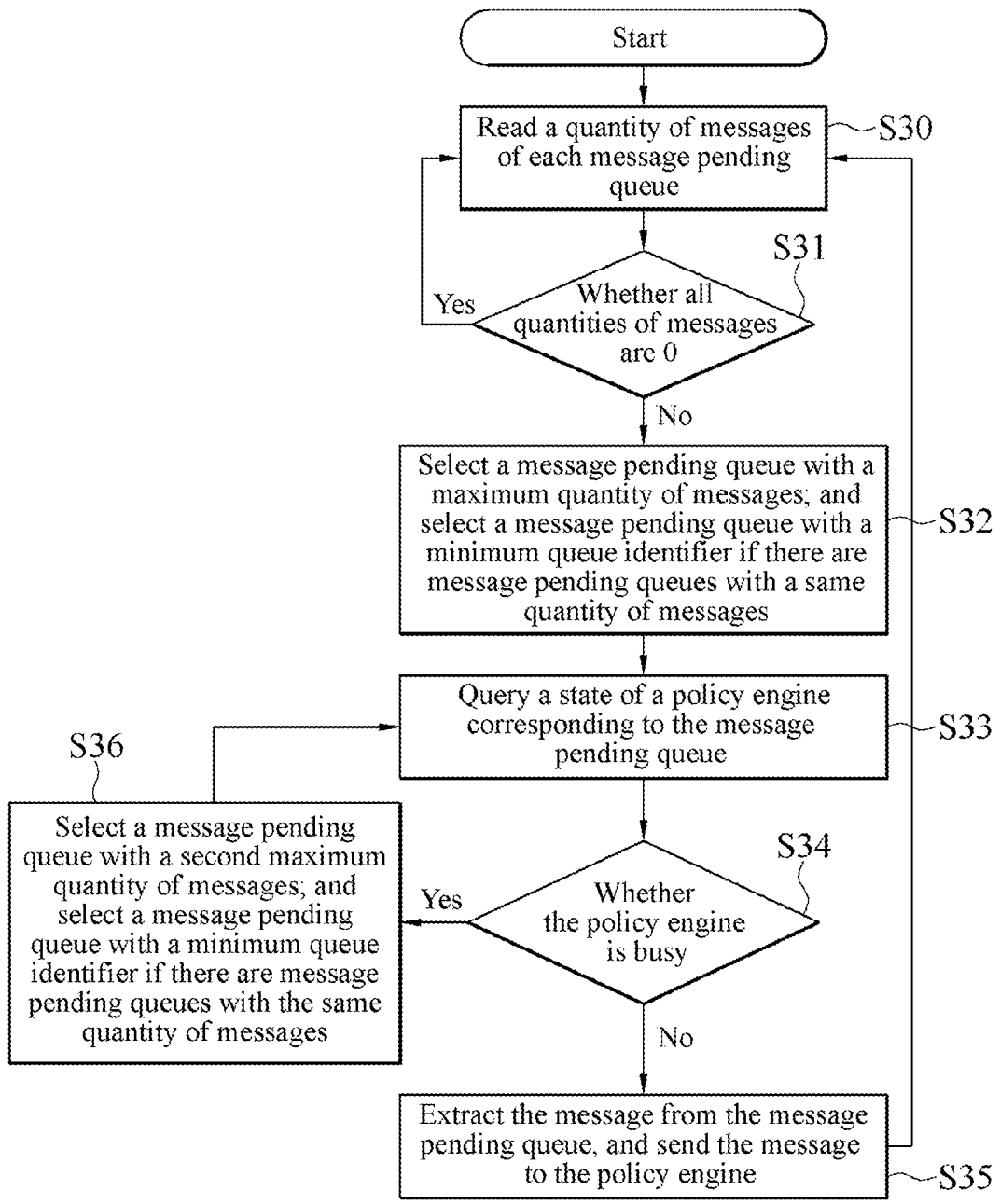
FIG. 5 is a schematic flowchart of an embodiment of processing a message by a message scheduler in a message request method according to the present invention.

FIG. 5 is a schematic flowchart of an embodiment of processing a message by a message scheduler in a message request method according to the present invention. Referring to FIG. 1 to FIG. 5, as shown in step S30, when executing the largest message pending first algorithm, the message scheduler 163 first reads a quantity of messages of each message pending queue 162 of the N message pending queues 162, and makes a comparison. As shown in step S31, it is determined whether all quantities of messages are 0. If all the quantities of messages are 0, the algorithm outputs 0, takes no action, and returns to step S30. If a quantity of messages of at least one of the message pending queues 162 is not 0, a next step is performed. As shown in step S32, when there is a maximum quantity of messages, the message scheduler 163 selects a message pending queue 162 with a maximum quantity of messages, and outputs a queue identifier corresponding to the message pending queue 162. When there are same maximum quantities of messages, the message scheduler 163 selects a message pending queue 162 with a minimum queue identifier in the message pending queues 162 with the same quantity of messages, and outputs a queue identifier corresponding to the message pending queue 162. After obtaining the queue identifier corresponding to the message pending queue (the algorithm outputs a value greater than 0), as shown in step S33, the message scheduler 163 queries, through the message egress port 164, a state of the policy engine 141 of the type-C port 14 corresponding to the queue identifier (the message pending queue 162). As shown in step S34, the message scheduler 163 determines whether the policy engine 141 is busy, that is, whether the policy engine 141 is in a busy state or a non-busy state. As shown in step S35, when the state of the policy engine 141 is the non-busy state, the message scheduler 163 extracts the message from the message pending queue 162 corresponding to the queue identifier, and sends, through the message egress port 164, the message to the corresponding policy engine 141, to make a request for the message. As shown in step S36, when the state of the policy engine 141 is the busy state, the message scheduler 163 selects a message pending queue 162 with a second maximum quantity of messages from the N message pending queues 162, and obtains a queue identifier corresponding to the message pending queue 162. If there are message pending queues 162 with a same second maximum quantity of messages, the message scheduler 163 selects a message pending queue 162 with a minimum queue identifier in these message pending queues 162, to output a queue identifier corresponding to the message pending queue 162, and returns to step S33, to continue to query the state of the policy engine 141 corresponding to the message pending queue 162. The entire process is completed after all messages in the message pending queue 162 are delivered to the corresponding policy engine 141.

According to an embodiment, in the USB multi-port electronic device 10, regardless of whether an electronic device is plugged into one or more of the type-C ports 14, the message request device 16 in the IC 12 performs a process of the steps of the foregoing signal request method for a message of the one or more type-C ports 14, to store and extract the message according to the message pending queue 162 corresponding to the port identifier of each type-C port 14, and perform the subsequent steps accordingly. For related contents, refer to the foregoing description, and details are not described herein again.

In summary, in the present invention, during the signal request scheduling, the requested message can be processed efficiently. Therefore, the present invention can effectively reduce the design complexity with the application of the USB multi-port electronic device, for example, the complexity of a device policy manager (control software) in the USB multi-port electronic device, thereby achieving the effect of real-time processing.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A message request method, applicable to a USB multi-port electronic device, the USB multi-port electronic device comprising N type-C ports, and the message request method comprising: receiving a message, and assigning, according to a port identifier of the message, the message to a corresponding message pending queue of N message pending queues; selecting, according to a largest message pending first algorithm, a message pending queue with a maximum quantity of messages from the N message pending queues, and obtaining a queue identifier corresponding to the message pending queue, the queue identifier being in a one-to-one correspondence with the port identifier; extracting the message from the message pending queue corresponding to the queue identifier; and delivering the message to a policy engine of a type-C port corresponding to the queue identifier, to make a request for the message;

wherein before the step of assigning the message to the corresponding message pending queue of the N message pending queues, further comprising: first determining whether the message pending queue is full, and assigning the message to the message pending queue when the message pending queue is not full.

2. The message request method according to claim 1, wherein when the message pending queue is full, a full command is delivered to a device policy management brain, causing the device policy management brain to redeliver the message.

3. The message request method according to claim 2, wherein after the step of assigning the message to the corresponding message pending queue of the N message pending queues, further comprising: returning a successful command to the device policy management brain.

4. The message request method according to claim 1, wherein the largest message pending first algorithm further comprises reading a quantity of messages of each message pending queue of the N message pending queues and making a comparison: outputting a queue identifier of a corresponding message pending queue when there is a maximum quantity of messages; outputting a minimum queue identifier in the message pending queues when there are same quantities of messages; and outputting 0 when all quantities of messages are 0.

5. The message request method according to claim 1, wherein after the step of obtaining the queue identifier corresponding to the message pending queue, further comprising: querying a state of the policy engine of the type-C port corresponding to the queue identifier, and extracting the message from the message pending queue corresponding to the queue identifier when the state of the policy engine is a non-busy state.

6. The message request method according to claim 5, wherein when the state of the policy engine is a busy state, a message pending queue with a second maximum quantity of messages is selected from the N message pending queues, and a queue identifier corresponding to the message pending queue is obtained.

7. The message request method according to claim 1, wherein each of the message pending queues comprises a plurality of queue units, and each queue unit buffers a message.

8. The integrated circuit implements a message request device, applicable to a USB multi-port electronic device, the USB multi-port electronic device comprising N type-C ports and an integrated circuit, and the message request device comprising: a classifier, configured to receive a message, and assign, according to a port identifier of the message, the message to a corresponding message pending queue of N message pending queues; a message scheduler, configured to select, according to a largest message pending first algorithm, a message pending queue with a maximum quantity of messages from the N message pending queues, and obtain a queue identifier corresponding to the message pending queue, the queue identifier being in a one-to-one correspondence with the port identifier; and a message egress port, signally connected to the message scheduler, the message scheduler being configured to extract the message from the message pending queue corresponding to the queue identifier, and deliver, through the message egress port, the message to a policy engine of a type-C port corresponding to the queue identifier, to make a request for the message;
wherein before the step of assigning the message to the corresponding message pending queue of the N message pending queues, further comprising: first determining whether the message pending queue is full, and assigning the message to the message pending queue when the message pending queue is not full.

9. The message request device according to claim 8, wherein when the message pending queue is full, the classifier delivers a full command to a device policy management brain, causing the device policy management brain to redeliver the message to the classifier.

10. The message request device according to claim 9, wherein after assigning the message to the corresponding message pending queue of the N message pending queues, the classifier returns a successful command to the device policy management brain.

11. The message request device according to claim 8, wherein in the largest message pending first algorithm, the message scheduler reads a quantity of messages of each message pending queue of the N message pending queues and makes a comparison: the message scheduler outputs a queue identifier of a corresponding message pending queue when there is a maximum quantity of messages: the message scheduler outputs a minimum queue identifier in the message pending queues when there are same quantities of messages; and the message scheduler outputs 0 when all quantities of messages are 0.

12. The message request device according to claim 8, wherein after obtaining the queue identifier corresponding to the message pending queue, the message scheduler queries a state of the policy engine of the type-C port corresponding to the queue identifier though the message egress port, and extracts the message from the message pending queue corresponding to the queue identifier when the state of the policy engine is a non-busy state.

13. The message request device according to claim 12, wherein when the state of the policy engine is a busy state, the message scheduler selects a message pending queue with a second maximum quantity of messages from the N message pending queues, and obtains a queue identifier corresponding to the message pending queue.

14. The message request device according to claim 8, wherein each of the message pending queues comprises a plurality of queue units, and each queue unit buffers a message.

* * * * *